United States Patent
Higaki et al.

(10) Patent No.: US 10,968,112 B2
(45) Date of Patent: Apr. 6, 2021

(54) METHOD FOR PRODUCING HIGH-PURITY SCANDIUM OXIDE

(71) Applicant: SUMITOMO METAL MINING CO., LTD., Tokyo (JP)

(72) Inventors: Tatsuya Higaki, Niihama (JP); Hiroshi Kobayashi, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 16/964,353

(22) PCT Filed: Jan. 23, 2019

(86) PCT No.: PCT/JP2019/002012
§ 371 (c)(1),
(2) Date: Jul. 23, 2020

(87) PCT Pub. No.: WO2019/146619
PCT Pub. Date: Aug. 1, 2019

(65) Prior Publication Data
US 2021/0032119 A1 Feb. 4, 2021

(30) Foreign Application Priority Data
Jan. 25, 2018 (JP) .............................. JP2018-010843

(51) Int. Cl.
C01F 17/32 (2020.01)
C22B 59/00 (2006.01)
(Continued)

(52) U.S. Cl.
CPC ............. *C01F 17/32* (2020.01); *C01F 17/13* (2020.01); *C22B 1/02* (2013.01); *C22B 3/065* (2013.01);
(Continued)

(58) Field of Classification Search
CPC ..................................................... C22B 59/00
See application file for complete search history.

(56) References Cited

U.S. PATENT DOCUMENTS

| | | | |
|---|---|---|---|
| 2012/0207656 A1* | 8/2012 | Duyvesteyn | C22B 1/04 423/21.1 |
| 2014/0193317 A1* | 7/2014 | Hartley | C22B 3/0005 423/21.5 |

(Continued)

FOREIGN PATENT DOCUMENTS

| | | |
|---|---|---|
| CN | 103361486 A | 10/2013 |
| EP | 3508593 A1 | 7/2019 |

(Continued)

OTHER PUBLICATIONS

Office Action dated Aug. 11, 2020, issued in the AU Patent Application No. 2019211653.
(Continued)

*Primary Examiner* — Melissa S Swain
(74) *Attorney, Agent, or Firm* — Locke Lord LLP (57) ABSTRACT

Provided is a method for obtaining high-purity scandium oxide efficiently from a solution containing scandium. The method for producing high-purity scandium oxide of the present invention has a first firing step S12 for subjecting a solution containing scandium to oxalation treatment using oxalic acid and firing the obtained crystals of scandium oxalate at a temperature of 400 to 600° C., inclusive, a dissolution step S13 for dissolving the scandium compound obtained by firing in one or more solutions selected from hydrochloric acid and nitric acid to obtain a solution, a reprecipitation step S14 for subjecting the solution to oxalation treatment using oxalic acid and generating a reprecipitate of scandium oxalate, and a second firing step S15 for firing the reprecipitate of obtained scandium oxalate to obtain scandium oxide.

8 Claims, 1 Drawing Sheet

(51) Int. Cl.
*C22B 1/02* (2006.01)
*C22B 3/06* (2006.01)
*C01F 17/13* (2020.01)
*C22B 3/42* (2006.01)
*C22B 3/44* (2006.01)
*C22B 3/10* (2006.01)

(52) U.S. Cl.
CPC .................. *C22B 3/10* (2013.01); *C22B 3/42* (2013.01); *C22B 3/44* (2013.01); *C22B 59/00* (2013.01)

(56) References Cited

U.S. PATENT DOCUMENTS

| | | |
|---|---|---|
| 2015/0307966 A1 | 10/2015 | Voight et al. |
| 2016/0047014 A1* | 2/2016 | Ozaki .................. C22B 3/22 75/743 |
| 2016/0340757 A1 | 11/2016 | Higaki et al. |

FOREIGN PATENT DOCUMENTS

| | | |
|---|---|---|
| JP | H04-198017 A | 7/1992 |
| JP | H08-232026 A | 9/1996 |
| JP | H09-324227 A | 12/1997 |
| JP | 2016-507636 A | 3/2016 |
| JP | 2016-153534 A | 8/2016 |
| JP | 2018-040020 A | 3/2018 |
| JP | 2018-111858 A | 7/2018 |
| RU | 2070596 C1 | 12/1996 |
| WO | 18/043242 A1 | 3/2018 |

OTHER PUBLICATIONS

E. L. Head et al., "The Thermal Decomposition of Scandium Formate and Oxalate", J., Inorg. Nucl. Chem., 1964. vol. 26, pp. 525-530, ISSN: 00221902. (cited in the ISR).

Xiu, Zhimeng et al., "Nanocrystalline Scandia Powders Via Oxalate Precipitation: The Effects of Solvent and Solution pH," J. Am. Ceram. Soc., Vo91, No. 2, 2008, pp. 603-606, ISSN:1551-2916. (cited in the ISR).

Decision to Grant a Patent dated Jul. 29, 2019, issued to JP Application No. 2018-010843.

International Search Report dated Apr. 10, 2019, issued for PCT/JP2019/002012.

\* cited by examiner

METHOD FOR PRODUCING HIGH-PURITY SCANDIUM OXIDE

TECHNICAL FIELD

The present invention relates to a method for producing scandium oxide, and more specifically, to a method for producing high-purity scandium oxide in which the amount of impurities is reduced.

BACKGROUND ART

In recent years, scandium that is attracting attention as a high-performance alloy with aluminum or a material for a fuel cell is mainly purified from titanium purification residues or a leachate obtained by leaching a nickel oxide ore with sulfuric acid, and recovering of scandium as a by-product has been advanced.

In such recovering of scandium in the related art, mainly, production of a high-purity product is performed by a solution purification treatment in which impurities are separated. That is, since scandium exists in a solution (for example, a leachate or the like) in a main step as mentioned above at a low concentration, it is necessary that scandium is gradually concentrated by performing methods such as an ion exchange method and a solvent extraction method in multiple stages, so that the concentration of scandium in the solution increases. By using those methods, the purity is increased to a grade necessary for an alloy, for example, a grade of 99.9% (3N product) or more, but it takes considerable time and effort, and this causes cost required for purification to remain high.

For example, Patent Document 1 discloses a method in which scandium oxide of a low grade is heated and dissolved with nitric acid, this nitric acid solution is brought into contact with an anion-exchange resin to allow adsorption of impurities existing in the solution, hydrochloric acid is further added to the solution and brought into contact with an anion-exchange resin to allow adsorption of other impurities by the resin, thereby separating scandium and impurities. In this method, it is described that oxalic acid or hydrofluoric acid is further added and the obtained precipitation product is fired to obtain high-purity scandium oxide.

However, in the method of Patent Document 1, since impurities coexisting in the same amount as scandium or coexisting in a far larger amount than scandium are separated, there are problems in that time and effort and cost required for separation of impurities increase, and impurities are unable to be completely separated.

As the method for separating impurities, a method for performing purification by redissolving and precipitating impurities which have been purified once is known, and is also widely used in industrial fields. However, even if an attempt is made to use such a method with respect to scandium oxide, scandium oxide is sparingly soluble in an aqueous solution of acid or the like, so that it is necessary to use a high concentration of acid in order to dissolve scandium oxide.

Further, even if scandium oxide can be dissolved, the acid concentration is high, so that only a solution having a scandium concentration of about 1 g/L to 3 g/L can be obtained. Further, even if an attempt is made to perform oxalate formation again, since the acid concentration is high, it is necessary to add about 12 equivalents of oxalic acid in order to obtain an actual yield of about 80%, and thus a problem arises in that the cost of chemicals increases.

As described above, in the method of related art, in the case of obtaining high-purity scandium oxide, it takes considerable time and effort and the cost increases, and further, there is an issue that handling of high concentration of acid causes a safety problem.

Patent Document 1: Japanese Unexamined Patent Application, Publication No. H8-232026

DISCLOSURE OF THE INVENTION

Problems to be Solved by the Invention

The present invention is proposed in view of such circumstances, and an object thereof is to provide a method for efficiently obtaining high-purity scandium oxide from a solution containing scandium.

Means for Solving the Problems

The present inventors have conducted intensive studies in order to solve the aforementioned problems. As a result, the present inventors have found that, by calcinating crystals of scandium oxalate under a specific temperature condition, a scandium compound exhibiting high solubility in an aqueous solution of acid or the like can be obtained, and have found that, by using this readily soluble scandium compound to prepare a redissolved solution and calcinating scandium oxalate generated from the redissolved solution to produce scandium oxide, high-purity scandium oxide is efficiently obtained, thereby completing the present invention.

(1) A first aspect of the present invention is a method for producing high-purity scandium oxide, the method including: a first calcination step of subjecting a solution containing scandium to an oxalate formation treatment using oxalic acid and calcinating crystals of obtained scandium oxalate at a temperature of 400° C. to 600° C.; a dissolution step of dissolving a scandium compound obtained by calcinating, in at least one solution selected from hydrochloric acid and nitric acid to obtain a solution; a reprecipitation step of subjecting the solution to an oxalate formation treatment using oxalic acid to generate a reprecipitation product of scandium oxalate; and a second calcination step of calcinating the obtained reprecipitation product of scandium oxalate to obtain scandium oxide.

(2) A second aspect of the present invention is the method for producing high-purity scandium oxide in the first invention, in which in the reprecipitation step, the oxalate formation treatment is performed while a temperature of the solution is adjusted to 40° C. or higher and lower than 100° C.

(3) A third aspect of the present invention is the method for producing high-purity scandium oxide in the first or second invention, in which in the second calcination step, the calcination is performed while a calcination temperature is set to 900° C. or higher.

(4) A fourth aspect of the present invention is the method for producing high-purity scandium oxide in the any one of the first to third inventions, in which the solution containing scandium is obtained by subjecting a raw solution containing scandium to an ion exchange treatment and/or a solvent extraction treatment.

Effects of the Invention

According to the present invention, it is possible to efficiently obtain high-purity scandium oxide from a solution containing scandium.

PREFERRED MODE FOR CARRYING OUT THE INVENTION

Hereinafter, specific embodiments of the present invention (hereinafter, referred to as "present embodiments") will be described in detail. Incidentally, the present invention is not limited to the following embodiment, and various modifications can be made within a range that does not change the spirit of the present invention. Further, in the present specification, the description "X to Y" (X and Y are arbitrary numerical values) means "X or more and Y or less" unless otherwise specified.

<<1. Outline>>

A method for producing scandium oxide according to the present embodiment is a method for subjecting a solution containing scandium to an oxalate formation treatment with oxalic acid to obtain scandium oxide from crystals of obtained scandium oxalate. Further, in this production method, by calcinating the scandium oxalate obtained from the solution containing scandium by the oxalic acid treatment in two stages, high-purity scandium oxide with fewer impurities is obtained.

Specifically, the method for producing scandium oxide according to the present embodiment includes: a first calcination step of subjecting a solution containing scandium to an oxalate formation treatment using oxalic acid and calcinating crystals of obtained scandium oxalate at a predetermined temperature; a dissolution step of dissolving a scandium compound obtained by calcinating, in at least one solution selected from hydrochloric acid and nitric acid to obtain a solution; a reprecipitation step of subjecting the solution to an oxalate formation treatment using oxalic acid to generate a reprecipitation product of scandium oxalate; and a second calcination step of calcinating the obtained reprecipitation product of scandium oxalate to obtain scandium oxide.

In such a method, in the first calcination step, by calcinating crystals of scandium oxalate under a specific temperature condition, it is possible to obtain a scandium compound exhibiting high solubility in an aqueous solution of acid or the like. Further, by using the easily soluble scandium compound obtained in this way, specifically, by dissolving the compound in at least one solution selected from hydrochloric acid and nitric acid to obtain a solution (redissolved solution), generating a reprecipitation product of scandium oxalate from the redissolved solution, and subjecting the reprecipitation product to a calcination treatment under a predetermined temperature condition, it is possible to efficiently obtain high-purity scandium oxide from which impurities are separated and removed.

Herein, as the solution containing scandium (hereinafter, also referred to as "scandium-containing solution"), it is possible to use a solution (sulfuric acid acidic solution) obtained in such a manner that a leachate obtained by subjecting a nickel oxide ore to a high pressure acid leach (HPAL) treatment is subjected to a sulfuration treatment and nickel is separated therefrom to obtain a post-sulfuration liquid, the post-sulfuration liquid is subjected to an ion exchange treatment and/or a solvent extraction treatment to separate impurities, and scandium is concentrated.

The ion exchange treatment to which the scandium-containing solution such as a post-sulfuration liquid obtained through the HPAL process for a nickel oxide ore is subjected is not particularly limited. For example, a treatment using, as a chelating resin, a resin having iminodiacetic acid as a functional group is exemplified. For example, in a case where the post-sulfuration liquid is a target to be treated, an ion exchange treatment is exemplified which has, as specific treatment steps, an adsorption step of bringing the post-sulfuration liquid into contact with the chelating resin to allow adsorption of scandium by the chelating resin, an aluminum removing step of bringing the chelating resin into contact with sulfuric acid to remove aluminum which has been adsorbed by the chelating resin, a scandium elution step of bringing the chelating resin which has been subjected to the aluminum removing step into contact with sulfuric acid to obtain a scandium eluate, and a chromium removing step of bringing the chelating resin which has been subjected to the scandium elution step into contact with sulfuric acid to remove chromium which has been adsorbed by the chelating resin in the adsorption step.

Further, the solvent extraction treatment is also not particularly limited, but the scandium eluate obtained through the ion exchange treatment as described above can be subjected to a solvent extraction treatment using an amine-based extractant, a phosphoric acid-based extractant, or the like. For example, a solvent extraction treatment is exemplified which has an extraction step of mixing the scandium eluate with an extractant to allow separation into a post-extraction organic solvent after extraction of impurities and a raffinate liquid containing scandium, a scrubbing step of mixing the post-extraction organic solvent with a hydrochloric acid solution or a sulfuric acid solution to separate scandium contained in the post-extraction organic solvent in a trace amount, and a backward extraction step of mixing a post-washing organic solvent with a backward extraction starting liquid to perform backward extraction of impurities from the post-washing organic solvent, thereby obtaining a backward extraction liquid.

In this way, in the scandium-containing solution obtained by performing the ion exchange treatment or the solvent extraction treatment, since impurity components are reduced and scandium is concentrated in the solution, scandium oxide obtained by using the scandium-containing solution as a raw material has a further higher scandium grade.

<<2. Regarding Respective Steps of Method for Producing Scandium Oxide>>

Figure 1:
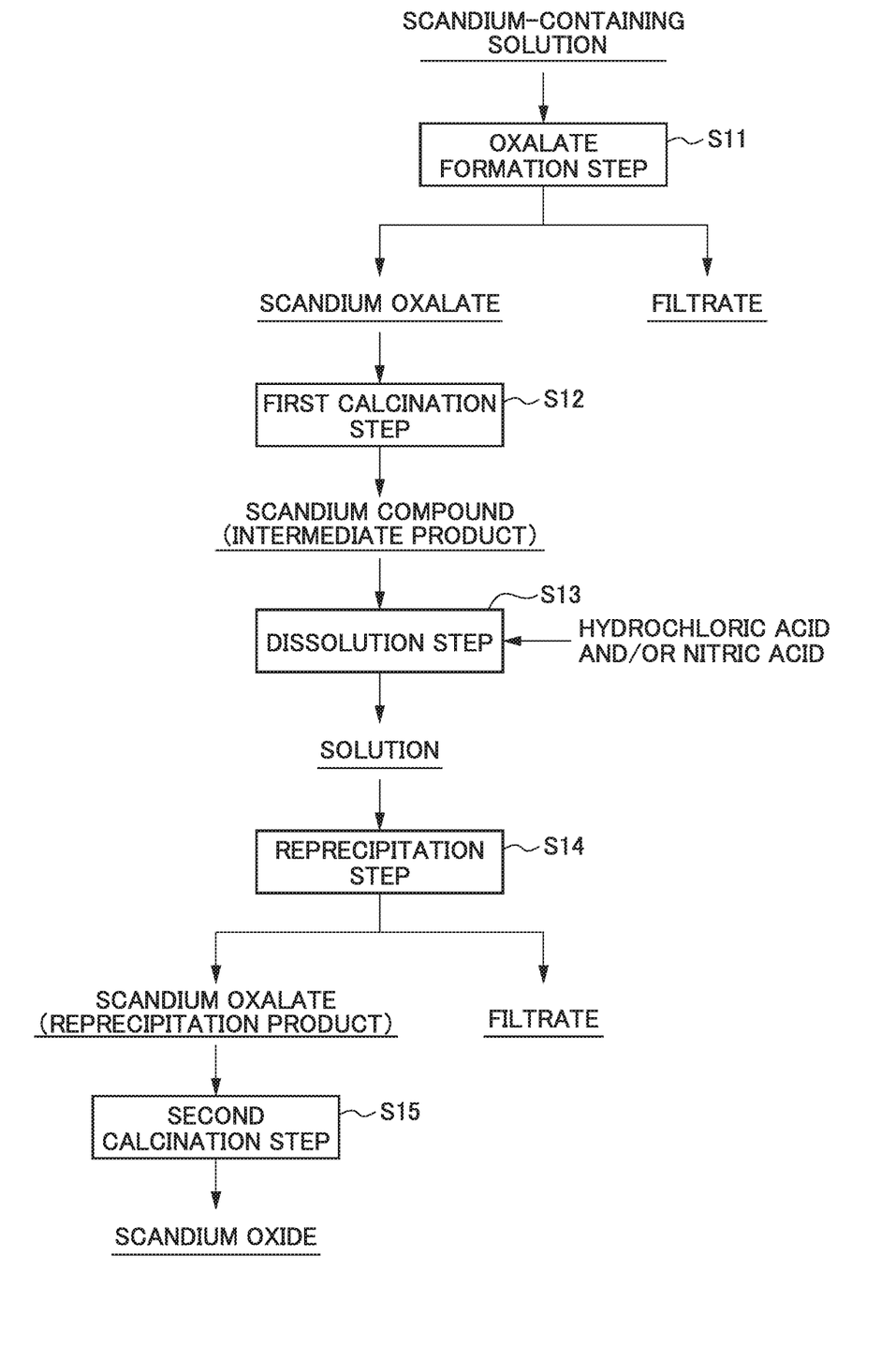
FIG. 1 is a process diagram illustrating an example of a flow of a method for producing scandium oxide.

FIG. 1 is a process diagram illustrating an example of a flow of the method for producing scandium oxide. As illustrated in FIG. 1, the production method includes an oxalate formation step S11 of subjecting a scandium-containing solution to an oxalate formation treatment, a first calcination step S12 of calcinating crystals of the obtained scandium oxalate at a predetermined temperature, a dissolution step S13 of dissolving a scandium compound as a fired product in a mineral acid to obtain a solution, a reprecipitation step S14 of subjecting the solution to an oxalate formation treatment to obtain a reprecipitation product of crystals of scandium oxalate, and a second calcination step S15 of calcinating the reprecipitation product of scandium oxalate to obtain scandium oxide.

[Oxalate Formation Step]

The oxalate formation step S11 is to subject a scandium-containing solution to an oxalate formation treatment. Specifically, in the oxalate formation step S11, a reaction of converting scandium into an oxalic acid salt (scandium oxalate) takes place, by adding oxalic acid to a scandium-containing solution.

By converting scandium into an oxalic acid salt in this way, handling properties such as filtration property can be improved, and scandium can be efficiently recovered. Further, according to this oxalate formation treatment, impurities in the solution can be separated.

The scandium-containing solution is not particularly limited, but a solution is used in which a scandium concentration is adjusted to a concentration of preferably 5 g/L to 10 g/L, more preferably about 5 g/L and the pH is adjusted to about 0 using an acid such as sulfuric acid.

As the method for the oxalate formation treatment, a method can be used in which oxalic acid is added to a scandium-containing solution and solid crystals of scandium oxalate are precipitated and generated on the basis of scandium in the scandium-containing solution. At this time, oxalic acid to be used may be in the form of a solid or a solution. Incidentally, in the method for the oxalate formation treatment, in a case where bivalent iron ions are contained as impurity components in the scandium-containing solution, in order to prevent iron(II) oxalate from being precipitated and generated, before the oxalate formation treatment, it is preferable to perform an oxidation treatment by adding an oxidant to control an oxidation reduction potential (ORP, reference electrode: silver/silver chloride) to a range of about 500 mV to 600 mV.

Alternatively, as the method for the oxalate formation treatment, a method can be used in which a scandium-containing solution is gradually added into an oxalic acid solution filled in a reaction container and solid crystals of scandium oxalate are precipitated and generated (so-called a reverse addition method). At this time, before the oxalate conversion treatment, it is preferable to adjust the pH of the scandium-containing solution to a range of −0.5 to 1. According to such a method for the oxalate formation treatment, it is possible to prevent iron(II) oxalate or the like from being precipitated and generated, and it is possible to recover higher-purity scandium without using an expensive oxidant or the like.

In the oxalate formation treatment, the temperature of the scandium-containing solution as a target to be treated is preferably adjusted to a range of 10° C. to 30° C. and more preferably adjusted to a range of 15° C. to 25° C.

Further, the amount of oxalic acid to be used in the treatment is preferably an amount in a range of 1.05 times to 1.2 times the equivalent necessary for precipitating scandium in the scandium-containing solution as an oxalic acid salt. When the used amount is less than 1.05 times the necessary equivalent, the whole amount of scandium may not be effectively recovered. On the other hand, a used amount of more than 1.2 times the necessary equivalent is unpreferable, because solubility of scandium oxalate increases so that scandium is redissolved to reduce a recovery rate, and the amount of an oxidant such as sodium hypochlorite needed to decompose excessive oxalic acid increases.

Crystals of the scandium oxalate obtained by such an oxalate formation treatment can be recovered by performing a filtration and washing treatment.

[First Calcination Step]

The first calcination step S12 is to fire crystals of the scandium oxalate obtained in the oxalate formation step S11 at a predetermined temperature. By performing such a calcination treatment at a predetermined temperature, a scandium compound as a fired product can be obtained.

Further, in the present embodiment, it is characterized in that in the first calcination step S12, the calcination is performed while a calcination temperature is set to a range of 400° C. to 600° C. According to this, a scandium compound exhibiting high solubility in an aqueous solution of acid or the like can be obtained as a fired product.

The present inventors have found that, by subjecting crystals of the scandium oxalate to calcination treatment in a temperature range condition of 400° C. to 600° C. that is a lower temperature range than that in prior art, a scandium compound that is easily soluble in an aqueous solution of acid or the like is obtained. Incidentally, in prior art, in order to fire scandium oxalate to obtain scandium oxide, it is necessary to set the calcination temperature to 900° C. or higher, preferably about 1100° C.

Furthermore, regarding an easily soluble scandium compound obtained in this way, a percentage decrease in weight with respect to the weight of crystals of scandium oxalate before the calcination treatment is in a range of 53% to 65%, preferably 55% to 65%, and more preferably 55% to 60%. Incidentally, the percentage decrease in weight refers to a percentage decrease in weight by calcinating, and can be represented by the following Equation [1] on the basis of a difference in weight before and after the calcination.

$$\text{Percentage decrease in weight (\%)}=(1-\text{Amount of material after calcination}/\text{Amount of material before calcination})\times 100 \quad [1]$$

Herein, in a case where scandium oxide ($Sc_2O_3$; molecular weight of 137.92) is obtained by calcinating scandium oxalate ($Sc_2C_6O_{12}$; molecular weight of 353.92), the percentage decrease in weight between before and after calcination is theoretically $(1-137.92/353.92)\times 100=61\%$. However, based on the fact that an easily soluble scandium compound obtained by performing the calcination treatment in a temperature range condition of 400° C. to 600° C. has an allowance of 55% to 65% in the percentage decrease in weight, the present inventors have found that when sparingly soluble scandium oxalate is heated and decomposed to sparingly soluble scandium oxide, there is a region in which an easily soluble form is obtained.

That is, the scandium compound exhibiting high solubility is considered not to be a compound in which crystals of scandium oxalate as a raw material have been completely decomposed by calcinating and the whole amount thereof has become scandium oxide but to be a compound which is in a state where scandium oxalate partially remains or $CO_2$, CO, or the like generated by decomposition remains. In practice, an easily soluble scandium compound obtained by performing the calcination in a temperature range condition of 400° C. to 600° C. contains a larger amount of carbon (C) than scandium oxide obtained by performing the calcination treatment at a high temperature in prior art.

Further, regarding the scandium compound exhibiting high solubility, even when X-ray diffraction analysis is performed, in a range closer to the lower limit temperature in which ease of dissolving is especially more remarkably exhibited, no characteristic diffraction peak is shown, so that the form of the compound is difficult to specify. Therefore, a compound in a region of ease of dissolving is simply and collectively called as a "scandium compound". Specifically, in the easily soluble scandium compound obtained by performing the calcination treatment in a temperature range condition of 400° C. to 600° C., a peak of scandium oxalate is not observed and a peak intensity corresponding to the peak of scandium oxide is 11000 counts or less. From this, it is considered that, in a scandium compound obtained by performing calcination at a temperature of 400° C. to 600° C., degree of crystallinity decreases, so that the compound has an easily soluble property.

Further, the scandium compound exhibiting high solubility has a property that the scandium compound is fine and has a BET specific surface area of 70 m$^2$/g or more. In particular, in a scandium compound obtained when a calcination temperature is set to 400° C., the BET specific surface area is 250 m$^2$/g or more. As described above, in the scandium compound obtained by performing the calcination in a temperature range condition of 400° C. to 600° C., the specific surface area increases, and as a result, a contact area with an acid solution when the compound is dissolved in the acid solution increases, and thus the compound is considered to be readily soluble. The specific surface area of the scandium compound is more preferably 100 m$^2$/g or more, further preferably 200 m$^2$/g or more, and particularly preferably 250 m$^2$/g or more.

Further, the condition for generating an easily soluble scandium compound in this way is to perform calcination in a temperature range condition of 400° C. to 600° C. and more preferably to perform calcination in a temperature range condition of 400° C. to 500° C. Further, in other words, such an easily soluble scandium compound is obtained by performing calcination in a condition that the percentage decrease in weight due to the calcinating is in a range of 53% to 65%, preferably 55% to 65%, and more preferably 55% to 60%.

Specifically, in the calcination treatment in the first calcination step S12, the crystals of the scandium oxalate obtained by the oxalate conversion treatment are washed with water and dried, and then fired using a predetermined furnace. The furnace is not particularly limited, but a tubular furnace or the like is exemplified, and use of a continuous furnace such as a rotary kiln is industrially preferred because drying and calcination can be performed with the same apparatus.

Further, the retention time when calcination is performed at a calcination temperature of 400° C. to 600° C. is not particularly limited, but is preferably 0.5 hour to 12 hours, more preferably 1 hour to 12 hours, and particularly preferably 1 hour to 6 hours. When the retention time is shorter than 0.5 hour, the calcination does not proceed sufficiently, and a large amount of sparingly soluble scandium oxalate may remain. Meanwhile, when the retention time is longer than 12 hours, the easily soluble property of scandium compound to be obtained may be almost not changed, or rather gradually degraded, and thermal energy increases so that treatment cost increases.

[Dissolution Step]

The dissolution step S13 is to dissolve the whole of the scandium compound as a fired product obtained by the calcination treatment in the first calcination step S12 in at least one solution selected from hydrochloric acid and nitric acid to obtain a solution.

As described above, by performing the calcination while a calcination temperature is set to a range of 400° C. to 600° C. in the first calcination step S12, it is possible to obtain a scandium compound exhibiting high solubility in an aqueous solution of acid or the like. Therefore, in the dissolution step S13, by dissolving the easily soluble scandium compound obtained in this way in at least one solution selected from hydrochloric acid and nitric acid, it is possible to obtain a solution that is a so-called redissolved solution in which scandium is eluted and scandium is concentrated.

As described above, in the method for producing scandium oxide according to the present embodiment, a redissolved solution is prepared using the easily soluble property of the obtained scandium compound, crystals of the scandium oxalate are obtained again in the subsequent step on the basis of the redissolved solution, and the crystals are fired to obtain scandium oxide, so that impurity elements can be efficiently separated and removed. According to this, high-purity scandium oxide in which the impurity amount is reduced can be produced.

The dissolution treatment in the dissolution step S13 is not particularly limited, but can be performed by adding pure water to the scandium compound, further adding at least one solution selected from hydrochloric acid and nitric acid thereto, and stirring. Further, as the temperature condition in the dissolution treatment, the dissolution treatment can be performed while the temperature is adjusted to a range of about 40° C. to 80° C.

Further, as the at least one solution selected from hydrochloric acid and nitric acid to be used in dissolution, although the pH condition is not particularly limited, a solution in which the pH is adjusted, for example, to about 0 to 2 may be used. Since the scandium compound to be dissolved in these acid solutions exhibits high solubility in an aqueous solution of acid or the like as described above, even under the condition of a pH of about 0 to 2, the scandium compound can be easily dissolved and the cost of chemicals for increasing concentration or the like can be effectively suppressed. Incidentally, sulfuric acid, which is a mineral acid likewise, also can be used as the acid solution, other than hydrochloric acid or nitric acid described above. However, experiments by the inventors proved that scandium oxalate with an even higher purity can be obtained by dissolution in hydrochloric acid than in sulfuric acid, though the mechanism is not clear.

Incidentally, as for the redissolved solution obtained in the dissolution step S13, for example, the scandium concentration can be increased to about 50 g/L and adjusted to an arbitrary value, and thereby, a decrease in an amount of liquid and a decrease in facility capacity can be achieved.

[Reprecipitation Step]

The reprecipitation step S14 is to obtain a reprecipitation product of crystals of the scandium oxalate by performing an oxalate formation treatment again using the solution (redissolved solution) obtained by redissolving the scandium compound in the dissolution step S13.

That is, in the reprecipitation step S14, the second oxalate formation is performed using the redissolved solution as a raw material. As described above, according to a method for redissolving the easily soluble scandium compound to generate crystals of scandium oxalate from the redissolved solution again, it is possible to significantly reduce the amount of impurities coexisting in the crystals of the scandium oxalate obtained by the second oxalate formation.

As the method for the oxalate formation treatment in the reprecipitation step S14, the treatment can be performed in a similar manner to the treatment performed in the oxalate formation step S11. For example, the oxalate formation treatment is performed using a solution in which the scandium concentration of the redissolved solution is adjusted to 5 g/L to 10 g/L, more preferably to about 5 g/L, and the pH is adjusted to about 0 using a mineral acid such as hydrochloric acid or nitric acid.

Further, in the second oxalate formation treatment, even when the amount of oxalic acid added in the oxalate formation treatment is restricted to no more than 3.0 equivalents with respect to scandium, scandium can be converted into scandium oxalate with a high actual yield, and the use cost of oxalic acid can be reduced.

Herein, in the oxalate formation treatment, by setting the liquid temperature of the solution (redissolved solution) at the time of reaction to 40° C. or higher, as compared to the case of performing the reaction at normal temperature (25° C.), particles of scandium oxalate to be obtained can be coarsened, and handling of the scandium oxalate when charging into a calcination furnace in the next calcination step (second calcination step) becomes easier. However, only by simply coarsening the particles, there is a concern that impurities enter gaps between particles to reduce the grade.

However, in the present embodiment, as described above, since an easily soluble scandium compound is redissolved and crystals of the scandium oxalate are generated from the redissolved solution again, it is possible to significantly reduce impurities coexisting in the crystals of the second scandium oxalate and it is possible to effectively coarsen particles. From this, handling can be effectively enhanced.

Incidentally, also regarding the liquid temperature condition of 100° C. or higher, since influence on coarsening is small and energy is needed unnecessarily, the temperature condition in the oxalate conversion treatment is set to preferably a range of 40° C. or higher and lower than 100° C. and more preferably a range of 40° C. to 60° C.

[Second Calcination Step]

The second calcination step S15 is to fire the reprecipitation product of scandium oxalate obtained in the reprecipitation step S14 at a predetermined temperature. That is, in the second calcination step S15, the second calcination treatment of calcinating crystals of the scandium oxalate obtained from the redissolved solution is performed and scandium oxide is obtained by the calcination treatment.

In the calcination treatment in the second calcination step S15, the condition of the calcination temperature is set to preferably 900° C. or higher, more preferably 1000° C. or higher, and particularly preferably about 1100° C. As described above, in the second calcination step S15, by calcinating crystals of the scandium oxalate in a high temperature condition of 900° C. or higher, a compound clearly having the form of scandium oxide is generated as a fired product. Further, by performing calcination in a high temperature condition in this way, it is possible to prevent carbon (C) derived from oxalic acid from remaining.

Further, as described above, since the easily soluble scandium compound is redissolved to generate crystals of the scandium oxalate from the redissolved solution again and the crystals of the scandium oxalate are fired, it is possible to obtain high-purity scandium oxide in which the impurity amount is reduced.

As the method for the calcination treatment in the second calcination step S15, similarly to the treatment in the first calcination step S12, crystals of the obtained scandium oxalate are washed with water and dried, and then fired using a tubular furnace, a continuous furnace, or the like.

Further, the retention time when calcination is performed at a high calcination temperature of 900° C. or higher is not particularly limited, but is set to preferably 0.5 hour to 12 hours, more preferably 1 hour to 12 hours, and particularly preferably 1 hour to 6 hours. When the retention time is shorter than 0.5 hour, the calcination does not sufficiently proceed, and a fired product in the form of scandium oxide may not be effectively obtained. On the other hand, when the retention time is longer than 12 hours, thermal energy increases so that treatment cost increases.

EXAMPLES

Hereinafter, the present invention will be described in more detail by means of Examples of the present invention. Incidentally, the present invention is not limited to the following Examples.

Example 1

<Generation of Scandium-Containing Solution>
(Hydrometallurgical Process of Nickel Oxide Ore)

A nickel oxide ore was leached with sulfuric acid using an autoclave, and neutralization was performed by adding slaked lime to the obtained leachate. Subsequently, a sulfurizing agent was added to the obtained post-neutralization liquid to cause a sulfuration reaction, and nickel, cobalt, and the like were separated as sulfides to obtain a post-sulfuration liquid containing scandium.

(Ion Exchange Treatment and Neutralization Treatment)

Subsequently, the obtained post-sulfuration liquid was subjected to an ion exchange treatment using a chelating resin, and impurities in the solution were separated to obtain an eluent (scandium eluate) containing scandium eluted from the chelating resin. Thereafter, a neutralizing agent was added to the scandium eluate to generate a precipitation product of scandium hydroxide.

(Solvent Extraction Treatment)

Subsequently, sulfuric acid was added to the precipitation product of scandium hydroxide and redissolved to obtain a solution (scandium solution), and the scandium solution was subjected to a solvent extraction treatment using an amine-based extractant, and thereby a scandium sulfate solution (scandium-containing solution) was obtained as a raffinate liquid.

<Oxalate Formation Step>

The obtained scandium sulfate solution was diluted by adding water until the scandium concentration was about 5 g/L, and the pH was adjusted to 0 using sulfuric acid. Further, the solution after the adjustment was used as an oxalate formation start liquid, and 65 L in total of the solution was prepared.

Subsequently, in order to react 2.7 equivalents of oxalic acid with respect to scandium in the start liquid, 27 L in total of a solution obtained by dissolving oxalic acid at a concentration of 100 g/L was prepared. Further, the oxalic acid solution was stored in a reaction container, and the start liquid was added into the oxalic acid solution at a flow rate of 270 ml/min. After the addition of the whole amount of the start liquid, stirring was performed over 1 hour. Incidentally, the conditions were set such that the reaction temperature was 25° C., the residence time was 5 hours, and the addition time was 4 hours. In the following Table 1, the treatment conditions of oxalate formation (first oxalate formation) are collectively presented.

TABLE 1

| Oxalate formation | Start liquid (Room temperature measurement value) | | | Oxalic acid | | | Sc | | |
|---|---|---|---|---|---|---|---|---|---|
| | Sc concentration (g/L) | pH | Liquid amount (L) | Concentration (g/L) | Equivalent | Liquid amount (L) | End liquid concentration (g/L) | actual yield (%) | Sc oxalate (g) |
| Oxalate formation (Oxalate formation step) | 4.80 | 0 | 65 | 100 | 2.7 | 27 | 0.24 | 92.0 | 2297.16 |

After termination of the stirring, the whole amount thereof was filtrated to separate crystals of scandium oxalate, and repulp washing using 1 L of pure water with respect to 50 g of the separated crystals was repeated three times.

<First Calcination Step>

Subsequently, some of the crystals of the scandium oxalate obtained by the oxalate formation treatment were fractionated, the crystals were put in a furnace and fired over 2 hours at a temperature of 1100° C., and the obtained fired product was analyzed. Incidentally, in the following Table 5, the analysis results of the fired product obtained at a calcination temperature of 1100° C. are presented ("Scandium oxide after first calcination treatment" in Table 5).

Meanwhile, 500 g of the crystals were fractionated from the remaining scandium oxalate crystals, and the crystals were put in a furnace and fired over 2 hours at a temperature of 400° C., thereby obtaining about 215 g of fired product. Further, a part of the fired product was analyzed. In the following Table 2, the calcination conditions at a calcination temperature of 400° C. are collectively presented.

TABLE 2

| | Calcination | | | | | |
|---|---|---|---|---|---|---|
| | | Time(hr) | | Sample(g) | | Percentage decrease in |
| | Temperature (° C.) | Temperature increasing | Retention | Before calcination | After calcination | weight (%) |
| Calcination treatment (First calcination step) | 400 | 1 | 2 | 500 | 215 | 57.0 |

<Redissolution Step>

Subsequently, 150 g of crystals were collected from the remaining fired product obtained by performing the calcination at a calcination temperature of 400° C., pure water was added thereto and heated to 60° C. while mixing, and hydrochloric acid was further added to adjust the pH to 1. According to this operation, a scandium solution in which 95% or more of 150 g of crystals of scandium oxalate were dissolved was obtained. In the following 3, the conditions of the dissolution treatment are collectively presented.

TABLE 3

| | Dissolution | | | | | | |
|---|---|---|---|---|---|---|---|
| | | | | After dissolution | | | |
| | Sample weight (g) | Acid | pH | Temperature (° C.) | Residue amount (g) | Filtrate (ml) | Sc concentration (g/L) | Leaching rate (%) |
| Redissolution (Dissolution step) | 400 | HCl | 1.08 | 60 | 0 | 2580 | 31 | 100.0 |

Incidentally, a solution obtained by diluting the obtained scandium solution such that the scandium concentration was be 5 g/L and adding hydrochloric acid thereto to adjust the pH to 0 was used as a redissolved solution, and 3.5 L of the redissolved solution was prepared.

<Reprecipitation Step>

Subsequently, in order to react 2.7 equivalents of oxalic acid with respect to scandium in the redissolved solution, 1.45 L of a solution obtained by dissolving oxalic acid at a concentration of 100 g/L was prepared. Further, the oxalic acid solution was stored in a reaction container, and the redissolved solution was added into the oxalic acid solution. After the addition of the whole amount of the redissolved solution, a state of stirring for 1 hour was held. Incidentally, the conditions were set such that the reaction temperature was 25° C., the residence time was 2 hours, and the addition time was 1 hour. In the following Table 4, the treatment conditions of oxalate conversion (second oxalate conversion) are collectively presented.

TABLE 4

| Oxalate formation | Start liquid (Room temperature measurement value) | | | Oxalic acid | | | Sc | | |
|---|---|---|---|---|---|---|---|---|---|
| | Sc concentration (g/L) | pH | Liquid amount (L) | Concentration (g/L) | Equivalent | Liquid amount (L) | End liquid concentration (g/L) | actual yield (%) | Sc oxalate (g) |
| Oxalate formation (Reprecipitation step) | 4.5 | 0 | 3.5 | 100 | 2.7 | 1.45 | 0.11 | 96.5 | 66.58 |

After termination of the stirring, the whole amount thereof was filtrated to separate crystals of scandium oxalate, and repulp washing using 2 L of pure water with respect to 66 g of the separated crystals was repeated twice.

<Second Calcination Step>

Subsequently, the crystals of the scandium oxalate after washing were put in a furnace and the second calcination was performed over 2 hours at a calcination temperature of 900° C. to generate scandium oxide. Further, the scandium oxide taken out from the furnace was analyzed.

The analysis of the scandium oxide was performed as follows. That is, regarding scandium (Sc), impurities of other 69 components were analyzed using an ICP and ICP mass spectrometry (ICP-MS) apparatus, and evaluation was performed while the remaining obtained by subtracting the amount of those impurities was regarded as scandium. Incidentally, the analysis of the scandium oxide after the first calcination treatment (1100° C.) was performed in a similar manner. In the following Table 5, the analysis results of the scandium oxide are presented ("Scandium oxide after second calcination treatment" in Table 5).

TABLE 5

| Test No. | | | Scandium oxide after first calcination treatment (1100° C. calcination) | Scandium oxide after second calcination treatment (900° C. calcination) |
|---|---|---|---|---|
| Element | Oxide | Number of times | Analysis result(ppm) | |
| Sc | $Sc_2O_3$ | 1.534 | 997,316 | 999,584 |
| Na | $Na_2O$ | 1.348 | 13 | 13 |
| Al | $Al_2O_3$ | 1.890 | 13 | 3.78 |
| Si | $SiO_2$ | 2.140 | 43 | 21 |
| P | $P_2O_5$ | 2.292 | 115 | 115 |
| S | $SO_4$ | 2.996 | 449 | 30 |
| K | $K_2O$ | 1.205 | 12 | 12 |
| Ca | CaO | 1.400 | 182 | 14 |
| Fe | $Fe_2O_3$ | 1.430 | 257 | 1 |
| Ni | NiO | 1.273 | 1,184 | 1 |
| Pb | PbO | 1.078 | 1 | 1 |
| Bi | $Bi_2O_3$ | 1.115 | 1 | 1 |
| Others | — | — | 414 | 203 |
| Impurity Total | | | 2,684 | 416 |

As presented in Table 5, the scandium oxalate obtained by the oxalate formation treatment was fired at 400° C., the obtained scandium compound was redissolved in hydrochloric acid, crystals of the scandium oxalate were generated from the redissolved solution again, and the scandium oxalate was fired at 900° C. to obtain scandium oxide, and in the scandium oxide thus obtained, the impurity amount was reduced and high-purity scandium oxide was obtained as compared to the scandium oxide after the first calcination treatment (1100° C.)

Example 2

<Generation of Scandium-Containing Solution>
(Hydrometallurgical Process of Nickel Oxide Ore)

A nickel oxide ore was leached with sulfuric acid using an autoclave, and neutralization was performed by adding slaked lime to the obtained leachate. Subsequently, a sulfurizing agent was added to the obtained post-neutralization liquid to cause a sulfuration reaction, and nickel, cobalt, and the like were separated as sulfides to obtain a post-sulfuration liquid containing scandium.

(Ion Exchange Treatment and Neutralization Treatment)

Subsequently, the obtained post-sulfuration liquid was subjected to an ion exchange treatment using a chelating resin, and impurities in the solution were separated to obtain an eluent (scandium eluate) containing scandium eluted from the chelating resin. Thereafter, a neutralizing agent was added to the scandium eluate to generate a precipitation product of scandium hydroxide.

(Solvent Extraction Treatment)

Subsequently, sulfuric acid was added to the precipitation product of scandium hydroxide and redissolved to obtain a solution (scandium solution), and the scandium solution was subjected to a solvent extraction treatment using an amine-based extractant, and thereby a scandium sulfate solution (scandium-containing solution) was obtained as a raffinate liquid.

<Oxalate Formation Step>

The obtained scandium sulfate solution was diluted by adding water until the scandium concentration was about 5 g/L, and the pH was adjusted to 0 using sulfuric acid. Further, the solution after the adjustment was used as an oxalate formation start liquid, and 65 L in total of the solution was prepared.

Subsequently, in order to react 2.7 equivalents of oxalic acid with respect to scandium in the start liquid, 27 L in total of a solution obtained by dissolving oxalic acid at a concentration of 100 g/L was prepared. Further, the oxalic acid solution was stored in a reaction container, and the start liquid was added into the oxalic acid solution at a flow rate of 270 ml/min. After the addition of the whole amount of the start liquid, stirring was performed over 1 hour. Incidentally, the conditions were set such that the reaction temperature was 25° C., the residence time was 5 hours, and the addition time was 4 hours. In the following Table 6, the treatment conditions of oxalate formation (first oxalate formation) are collectively presented.

TABLE 6

| Oxalate formation | Start liquid (Room temperature measurement value) | | | Oxalic acid | | | Sc | | |
|---|---|---|---|---|---|---|---|---|---|
| | Sc concentration (g/L) | pH | Liquid amount (L) | Concentration (g/L) | Equivalent | Liquid amount (L) | End liquid concentration (g/L) | actual yield (%) | Sc oxalate (g) |
| Oxalate formation (Oxalate formation step) | 4.80 | 0 | 65 | 100 | 2.7 | 27 | 0.24 | 92.0 | 2297.16 |

After termination of the stirring, the whole amount thereof was filtrated to separate crystals of scandium oxalate, and repulp washing using 1 L of pure water with respect to 50 g of the separated crystals was repeated three times.

<First Calcination Step>

Subsequently, some of the crystals of the scandium oxalate obtained by the oxalate formation treatment were fractionated, the crystals were put in a furnace and fired over 2 hours at a temperature of 1100° C., and the obtained fired product was analyzed. Incidentally, in the following Table 10, the analysis results of the fired product obtained at a calcination temperature of 1100° C. are presented ("Scandium oxide after first calcination treatment" in Table 10).

Meanwhile, 500 g of the crystals were fractionated from the remaining scandium oxalate crystals, and the crystals were put in a furnace and fired over 2 hours at a temperature of 400° C., thereby obtaining about 215 g of fired product. Further, a part of the fired product was analyzed. In the following Table 7, the calcination conditions at a calcination temperature of 400° C. are collectively presented.

TABLE 7

| | Calcination | | | | | |
|---|---|---|---|---|---|---|
| | | Time(hr) | | Sample(g) | | Percentage decrease in weight (%) |
| | Temperature (° C.) | Temperature increasing | Retention | Before calcination | After calcination | |
| Calcination treatment (First calcination step) | 400 | 1 | 2 | 500 | 215 | 57.0 |

<Redissolution Step>

Subsequently, 150 g of crystals were collected from the remaining fired product obtained by performing the calcination at a calcination temperature of 400° C., pure water was added thereto and heated to 60° C. while mixing, and hydrochloric acid was further added to adjust the pH to 1. According to this operation, a scandium solution in which 95% or more of 150 g of crystals of scandium oxalate were dissolved was obtained. In the following Table 8, the conditions of the dissolution treatment are collectively presented.

TABLE 8

| | Dissolution | | | | | | |
|---|---|---|---|---|---|---|---|
| | | | | After dissolution | | | |
| | Sample weight (g) | Acid | pH | Temperature (° C.) | Residue amount (g) | Filtrate (ml) | Sc concentration (g/L) | Leaching rate (%) |
| Redissolution (Dissolution step) | 400 | HCl | 1.08 | 60 | 0 | 2580 | 31 | 100.0 |

Incidentally, a solution obtained by diluting the obtained scandium solution such that the scandium concentration was 5 g/L and adding hydrochloric acid thereto to adjust the pH to 0 was used as a redissolved solution, and 3.5 L of the redissolved solution was prepared.

<Reprecipitation Step>

Subsequently, in order to react 2.7 equivalents of oxalic acid with respect to scandium in the redissolved solution, 1.45 L of a solution obtained by dissolving oxalic acid at a concentration of 100 g/L was prepared for each test condition. Further, the redissolved solution was stored in a reaction container, and the oxalic acid solution was added into the redissolved solution. After the addition of the whole amount of the oxalic acid solution, a state of stirring for 1 hour was held. Incidentally, the conditions were set such that the reaction temperature was 25° C., the residence time was 2 hours, and the addition time was 1 hour. In the following Table 9, the treatment conditions of oxalate formation (second oxalate formation) are collectively presented.

solution, was used. This is because scandium oxalate with sufficiently high quality was obtained in the first oxalate formation and the scandium oxalate could be sufficiently dissolved in hydrochloric acid in the dissolution step. High-level purification was confirmed to be possible even in this case.

<Second Calcination Step>

Subsequently, the crystals of the scandium oxalate after washing were put in a furnace and the second calcination was performed over 2 hours at a calcination temperature of 900° C. to generate scandium oxide. Further, the scandium oxide taken out from the furnace was analyzed.

The analysis of the scandium oxide was performed as follows. That is, regarding scandium (Sc), impurities of other 69 components were analyzed using an ICP and ICP mass spectrometry (ICP-MS) apparatus, and evaluation was performed while the remaining obtained by subtracting the amount of those impurities was regarded as scandium. Incidentally, the analysis of the scandium oxide after the first calcination treatment (1100° C.) was performed in the similar manner.

In the following Table 10, the analysis results of the scandium oxide are presented ("Scandium oxide after second calcination treatment" in Table 10).

TABLE 9

| | Start liquid (Room temperature measurement value) | | | Oxalic acid | | | Sc | | |
|---|---|---|---|---|---|---|---|---|---|
| Oxalate formation | Sc concentration (g/L) | pH | Liquid amount (L) | Concentration (g/L) | Equivalent | Liquid amount (L) | End liquid concentration (g/L) | actual yield (%) | Sc oxalate (g) |
| Oxalate formation (Reprecipitation step) | 4.5 | 0 | 3.5 | 100 | 2.7 | 1.45 | 0.11 | 96.5 | 65.92 |

After termination of the stirring, the whole amount thereof was filtrated to separate crystals of scandium oxalate, and repulp washing using 2 L of pure water with respect to 66 g of the separated crystals was repeated three times.

Incidentally, although in the reprecipitation step which is the second oxalate formation in Example 1 above, a so-called "reverse addition method", in which a reprecipitation solution is added to an oxalic acid solution, was used, in the reprecipitation step which is the second oxalate formation in the present Example, a general "normal addition method", in which an oxalic acid solution is added to a precipitation

TABLE 10

| | | | Scandium oxide after first calcination treatment (1100° C. calcination) | Scandium oxide after second calcination treatment (900° C. calcination) |
|---|---|---|---|---|
| Element | Oxide | Number of times | Analysis result(ppm) | |
| Sc | $Sc_2O_3$ | 1.534 | 997,316 | 999,578 |
| Na | $Na_2O$ | 1.348 | 13 | 13 |

TABLE 10-continued

| Element | Oxide | Number of times | Scandium oxide after first calcination treatment (1100° C. calcination) | Scandium oxide after second calcination treatment (900° C. calcination) |
|---|---|---|---|---|
| | | | Analysis result(ppm) | |
| Al | $Al_2O_3$ | 1.890 | 13 | 6 |
| Si | $SiO_2$ | 2.140 | 43 | 21 |
| P | $P_2O_5$ | 2.292 | 115 | 115 |
| S | $SO_4$ | 2.996 | 449 | 30 |
| K | $K_2O$ | 1.205 | 12 | 12 |
| Ca | CaO | 1.400 | 182 | 14 |
| Fe | $Fe_2O_3$ | 1.430 | 257 | 1 |
| Ni | NiO | 1.273 | 1,184 | 1 |
| Pb | PbO | 1.078 | 1 | 1 |
| Bi | $Bi_2O_3$ | 1.115 | 1 | 1 |
| Others | — | — | 414 | 207 |
| Impurity Total | | | 2,684 | 422 |

As presented in Table 10, the scandium oxalate obtained by the oxalate formation treatment was fired at 400° C., the obtained scandium compound was redissolved in hydrochloric acid, crystals of the scandium oxalate were generated from the redissolved solution again, and the scandium oxalate was fired at 900° C. to obtain scandium oxide, and in the scandium oxide thus obtained, the impurity amount was reduced and high-purity scandium oxide was obtained as compared to the scandium oxide after the first calcination treatment (1100° C.)

The invention claimed is:

1. A method for producing high-purity scandium oxide, the method comprising:
    a first calcination step of subjecting a solution containing scandium to an oxalate formation treatment using oxalic acid and calcinating crystals of obtained scandium oxalate at a temperature of 400° C. to 600° C.;
    a dissolution step of dissolving a scandium compound obtained by calcinating, in at least one selected from hydrochloric acid and nitric acid to obtain a solution;
    a reprecipitation step of subjecting the solution to an oxalate formation treatment using oxalic acid to generate a reprecipitation product of scandium oxalate; and
    a second calcination step of calcinating the obtained reprecipitation product of scandium oxalate to obtain scandium oxide.

2. The method for producing high-purity scandium oxide according to claim 1,
    wherein in the reprecipitation step, the oxalate formation treatment is performed while a temperature of the solution is adjusted to 40° C. or higher and lower than 100° C.

3. The method for producing high-purity scandium oxide according to claim 1, wherein in the second calcination step, the calcination is performed while a calcination temperature is set to 900° C. or higher.

4. The method for producing high-purity scandium oxide according to claim 1,
    wherein the solution containing scandium is obtained by subjecting a raw solution containing scandium to an ion exchange treatment and/or a solvent extraction treatment.

5. The method for producing high-purity scandium oxide according to claim 2, wherein in the second calcination step, the calcination is performed while a calcination temperature is set to 900° C. or higher.

6. The method for producing high-purity scandium oxide according to claim 2, wherein the solution containing scandium is obtained by subjecting a raw solution containing scandium to an ion exchange treatment and/or a solvent extraction treatment.

7. The method for producing high-purity scandium oxide according to claim 3, wherein the solution containing scandium is obtained by subjecting a raw solution containing scandium to an ion exchange treatment and/or a solvent extraction treatment.

8. The method for producing high-purity scandium oxide according to claim 5, wherein the solution containing scandium is obtained by subjecting a raw solution containing scandium to an ion exchange treatment and/or a solvent extraction treatment.

* * * * *